Patented Sept. 12, 1944

2,358,201

UNITED STATES PATENT OFFICE 2,358,201

PREPARATION OF GELS

Abraham Sidney Behrman, Chicago, Ill., assignor to Infilco Incorporated, a corporation of Delaware No Drawing. Application August 28, 1940, Serial No. 354,603

12 Claims. (Cl. 23—182)

This invention relates to improvements in gels and is directed primarily to, and has as its principal objects, new and improved methods of preparing silica hydrogels and dried silica gels and the products prepared by these methods. A particular object of the invention is a new and economical method of preparing a quick-setting silica hydrogel. Another object of the invention is a novel and unique method of preparing a quick-setting silica hydrogel by the incomplete neutralization of the alkali of an alkali metal silicate solution with an acid, followed by treatment of this hydrogel with acid to neutralize the residual alkali of the hydrogel and liberate the remaining silicic acid. Other objects of the invention will become apparent on further reading of this specification and the claims.

Silica hydrogels are practically always prepared by first forming a colloidal solution of silicic acid which subsequently sets to a hydrogel. The colloidal solution of silicic acid is usually prepared by neutralizing a solution of sodium silicate or potassium silicate with an excess of a strong acid such as sulfuric or hydrochloric acid. The colloidal solution of silicic acid thus prepared generally requires from several hours up to several days to set spontaneously to a hydrogel, even though the silica concentration be relatively high. Coagulation and gelation of the colloidal solution may be somewhat accelerated in some cases by heating, although this expedient is seldom practical.

The delay in gelation just mentioned is frequently very objectionable, not only because of the extra equipment and storage facilities required for large-scale production, but also because it greatly complicates further processing of the hydrogel as compared with what would suffice if the hydrogel could be made to set immediately. Thus, for example, if it is desired to subject the hydrogel to pressure in an hydraulic press in order to lower its moisture content, a hydrogel which sets almost immediately can be cast in a press form and pressed only a relatively few minutes after the reacting solutions are mixed, whereas the usual slower-setting hydrogel requires storage for several days before becoming hard enough to be pressed, when it is transferred by necessarily clumsy and laborious methods to the press system and pressed with considerable difficulty due to the broken up and irregular nature of the hydrogel particles.

The most satisfactory method I have found hitherto for preparing a quick-setting silica hydrogel free of combined soda or potash is described in my Patent No. 1,755,496, issued April 22, 1930. In the process therein described, a colloidal solution of silicic acid is prepared by neutralizing an alkali metal silicate solution with an excess of strong acid and is then treated with an alkaline substance such as ammonium hydroxide to neutralize the excess acid. A stiff, firm hydrogel is typically formed in from 10 to 30 seconds when proper proportions and concentrations of solutions and other suitable conditions of preparation are utilized. This hydrogel may then be dried—with or without any intermediate processing such as pressing, washing or the like—to produce a hard, dried silica gel of excellent physical characteristics and having many industrial uses.

For certain special purposes, however, the method just described has not been found altogether desirable, principally because in these cases the use of ammonia (or its equivalent) leaves undesirable residues in the gel, and because of the expense of this reagent. Thus, for example, in the manufacture of lead storage battery separators, in which silica hydrogel is mixed with an inert binder such as rubber, the necessity for low manufacturing cost may make the expense of the ammonia objectionable. Furthermore, the presence of nitrogen compounds has been shown to be highly objectionable in the storage battery electrolyte; accordingly, it has been found desirable to treat silica hydrogel or dried silica gel prepared by the method just described with a strong acid, preferably sulfuric acid, to neutralize any uncombined ammonia (as well as to dissolve any iron compounds present) and to follow the acid treatment with a thorough washing with water.

The present invention makes it possible to obtain the advantages of the quick-setting, pure silica hydrogel of my former method just described and also makes unnecessary the use of ammonia, thus avoiding both the expense and the inherent chemical objections connected with the use of this reagent. This result is achieved through my discovery that it is possible to make a quick-setting silica hydrogel by mixing in proper proportions and concentrations a solution of an alkali metal silicate with a quantity of an acid, preferably a strong acid, such as sulfuric or hydrochloric acid insufficient to neutralize completely the alkali of the silicate; that this hydrogel, presumably consisting essentially of silicic acid and undecomposed sodium silicate, may then be treated with a further quantity of acid sufficient to neutralize the residual silicate and free the remainder of the silicic acid; that the thus-liberated silicic acid hydrosol coagulates and adds to and becomes an integral part of the original hydrogel; that this final hydrogel is possessed of excellent physical and chemical characteristics, suitable for many special purposes as, for example, in the manufacture of storage battery separators as previously mentioned; and, finally, that the hydrogel resulting from this two-stage process may be dried (with or without any intermediate pressing, washing or other treatment) to produce a dried silica gel that is hard, homogeneous, transparent (or translucent), highly porous and adsorbent and suited to many applications in industry and the arts.

The degree of neutralization of the alkali of the alkali metal silicate accomplished in the initial mixture of the silicate and acid solutions may be varied over rather wide limits depending on a number of factors such as the concentrations of the reagents, the composition of the silicate, the temperature of the solutions, and the desired setting time. Neutralization should not be too incomplete, however, as too much residual alkali tends to inhibit rapid gelation. While permissible latitude makes it undesirable to attempt to set definite limits, I have generally attained good results under the conditions and with the reagents employed by neutralizing about 85 to 95 per cent of the alkali.

The silicate and acid solutions may be mixed in any convenient manner. Any acid strong enough to set free silicic acid may be employed, but in general I prefer to use a strong acid such as sulfuric or hydrochloric acid. More care is required when working with concentrated than with dilute reaction mixtures in order to avoid too rapid gelation and local precipitation. While batch mixing may be employed, I prefer in general to use a continuous method, as by the convergence of streams (and with additional stirring if desired) of the reacting solutions issuing from orifices under constant head as described in my Patent No. 1,756,625, issued April 29, 1930. A method of mixing which I have found especially convenient in working with highly concentrated solutions is first to mix all of the acid with less than enough silicate to neutralize it, thus forming a colloidal silicic acid solution and then mixing this solution with the remainder of the silicate solution; this procedure is somewhat less critical and frequently permits the use of somewhat higher concentrations than if all the acid and all the silicate are mixed at once.

The acid used for neutralizing the residual alkali of the undecomposed silicate and thus setting free the remaining silicic acid in the hydrogel is preferably a strong acid such as sulfuric or hydrochloric acid and may be of any convenient strength. In many cases I have found a 0.7 Normal solution of sulfuric acid both convenient and economical. The acid treatment may be carried out in any suitable apparatus and manner. I have found it convenient to employ a wood, rubber-lined, or lead-lined combined immersion and washing tank, this tank being provided with a hard rubber header and lateral pipe distribution system, covered with gravel, very similar to the construction used in the bottom of sand filters or zeolite softeners utilized in water purification. The tank is filled with acid (0.7 Normal sulfuric acid, for example) to a predetermined level; and the hydrogel, preferably broken up into small lumps as by passing it through a 2 or 4 mesh screen is placed in the tank in an amount which will remain covered by the acid. The particles of hydrogel are allowed to remain in the acid until the neutralization of the residual alkali is complete (as may readily be determined by breaking open a lump of the hydrogel and testing with a drop of methyl orange indicator solution) and until gelation of the liberated silicic acid is effected. In practice an overnight soaking in the acid is very convenient.

This acid-soaking or acid wash performs several useful functions. It liberates the remaining silicic acid, just described; it dissolves and makes water soluble iron oxide and other iron compounds, the presence of which may be extremely detrimental; and it shortens the subsequent water washing and minimizes the loss of silica in the water washing, since the silica of the hydrogel is less soluble in acid than in water.

After the soaking or washing with acid has been completed, the hydrogel may be washed with water to remove residual acid and salts. A convenient method is to drain out the acid, then wash either upflow or downflow with water until the wash water and hydrogel particles are alkaline to methyl orange and until the wash water has substantially the same sulfate content in the influent and effluent. The wash tank should be provided with the usual piping and valve arrangements to permit either downflow or upflow washing and backwashing.

Further processing, if any, of the washed hydrogel will depend on the use to which it is to be put. If desired, the moisture content of the hydrogel may be reduced, as by pressing, to make it more suitable for use in the manufacture of certain types of storage battery separators. Or the hydrogel, with or without pressing, may be dried to substantially complete dryness, as in a current of warm air, to produce hard granules of highly porous dried silica gel having marked adsorbent and other useful properties. Sometimes it may be considered desirable to press the hydrogel, after all the silicic acid of the silicate has been liberated by the secondary acid treatment, before washing with water in order to facilitate the washing process; in such cases it may also be found advantageous to subject the washed hydrogel to a second and if necessary a higher degree of pressing to secure a washed hydrogel of the required moisture content suitable for the particular use or subsequent processing involved.

Having thus described my invention, I will now give typical examples utilizing it in the production of silica hydrogel and dried silica gel. For convenience in exemplification, the preparation will be described in terms of laboratory quantities and using batch mixing. Two hundred and fifty cc. 42° Baumé sodium silicate (containing about 9.5% $Na_2O$ and 29.5% $SiO_2$) is diluted to 900 cc. with water and mixed with 150 cc. 6.3 Normal sulfuric acid prepared by appropriate dilution of 66° sulfuric acid. The degree of alkali neutralization in this case is about 87 per cent. The alkaline reaction mixture quickly sets to a stiff gel, which is broken up into small lumps, as by being forced through a 2 or 4 mesh screen, and then soaked overnight in 0.7 Normal sulfuric acid. If the hydrogel is to be used in hydrogel form in the manufacture of battery separators or other purposes, it may be subsequently washed with water to remove the sodium sulfate and excess acid. Preferably, the washing with water is preceded by pressing the hydrogel, as in an hydraulic press, to reduce the volume of the hydrogel and thus facilitate washing with water; if this procedure is employed, the washing with water may be followed by a second pressing to reduce the moisture content of the hydrogel to the point desired for further processing.

If, however, it is desired to form a dried silica gel, the hydrogel after soaking in acid is subsequently dried to substantially complete dryness, or at least to the point of irreversibility, with the production of hard, vitreous particles. In actual practice this is usually accomplished by drying down to a residual moisture content of 5 to 15 per cent, although the moisture content corresponding to the point of irreversibility is much higher than this value. The drying step may be preceded by washing with water to remove soluble salts and acid, or the washing may be deferred until after the drying. Pressing the hydrogel before and/or after the washing with water may also be practiced, depending on the particular results and type of product desired. In any case, the dried gel will be found to possess properties making it valuable in a great many ways, such as an adsorbent, a catalyst, a catalyst carrier, or a dried gel suitable for use in making battery separators according to my Reissue Patent No. 18,214, dated September 29, 1931.

In a modification of the above procedure which allows somewhat greater flexibility and less critical handling and frequently permits the use of somewhat more concentrated reaction mixtures, I first mix all the acid with part of the silicate to form a colloidal solution of silicic acid, and then mix this solution with the remainder of the silicate. To illustrate, I may first mix 1000 cc. of a silicate solution, containing 385 cc. 42° sodium silicate, with 272 cc. 6.3 Normal sulfuric acid, preferably by adding the silicate solution to the acid slowly and with stirring. The clear colloidal solution of silicic acid thus produced is then mixed rapidly with 364 cc. of silicate solution containing 70 cc. 42° silicate. In a few seconds a stiff hydrogel results. This hydrogel may then be broken up into small lumps and soaked in an acid of convenient strength, as for example the 0.7 Normal sulfuric acid above mentioned; and the acid-treated hydrogel may subsequently be processed to produce a final hydrogel or dried silica gel along the general lines described in connection with the preceding example. Whether the final product is a hydrogel or a dried silica gel, it will be found to possess properties making it susceptible to a wide variety of uses in industry and the arts.

It will be understood that a distinction is made between "hydrogel," which is the gelation product with contained water prior to drying and "gel" which is the dried hydrogel. Thus in speaking in the following claims of treating the hydrogel with an acid solution, it will be understood as meaning the original hydrogel prior to substantial drying to the dried particle form.

It will be obvious that the invention described in the foregoing disclosure lends itself to a variety of modifications without departing from the underlying principle of the invention. All such modifications are contemplated as coming within the scope of the invention as defined in the appended claims.

What is claimed is:

1. A process for producing silica hydrogel which comprises the steps, in sequence, of first forming an alkaline hydrogel from an alkaline reaction mixture of a solution of an alkali metal silicate and an amount of acid insufficient to neutralize the silicate and subsequently treating the undried hydrogel with a solution of an acid for a period sufficient to neutralize the residual alkali of the hydrogel.

2. A process for producing silica hydrogel which comprises the steps, in sequence, of first forming an alkaline hydrogel by mixing a solution of an alkali metal silicate with a solution of an acid in an amount insufficient for complete neutralization of the alkali of the silicate but sufficient to cause the formation of a hydrogel, and thereafter immersing this undried hydrogel in a solution of an acid capable of setting free the remaining silicic acid for a period sufficient to provide at least substantially complete neutralization of the residual alkali of the hydrogel.

3. A process for producing silica hydrogel which comprises the steps, in sequence, of first forming an alkaline hydrogel from a reaction mixture of a solution of sodium silicate and an amount of sulfuric acid insufficient to neutralize completely the alkali of the silicate but sufficient to cause the formation of a hydrogel and then, previous to any substantial drying of the hydrogel, neutralizing the residual alkali of the hydrogel by soaking the hydrogel in a dilute solution of sulfuric acid until an acid silica hydrogel is produced.

4. A process according to claim 1 in which the hydrogel after the secondary acid treatment is washed with water to remove soluble compounds.

5. A process according to claim 1 in which the hydrogel after the secondary treatment is pressed to reduce the moisture content of the hydrogel.

6. A process for producing an acid silica hydrogel which comprises the steps, in sequence, of first mixing solutions of an alkali metal silicate and an acid in such quantity that an acid solution is produced without precipitation of the hydrogel, then adding further quantities of alkali metal silicate solution until an alkaline solution is produced and gelation of an alkaline hydrogel occurs, and thereafter maintaining the undried hydrogel submerged in a solution of an acid until an acid silica hydrogel is produced.

7. A process for producing silica gel which comprises the steps, in sequence, of first forming an alkaline hydrogel by mixing a solution of an alkali metal silicate with a solution of an acid in an amount insufficient to neutralize completely the alkali of the silicate but sufficient to cause the formation of a hydrogel, then soaking the undried hydrogel in sufficient acid to neutralize the residual alkali of the hydrogel until an acid silica hydrogel is produced, and finally drying the hydrogel.

8. A process for producing silica hydrogel which comprises the steps, in sequence, of first forming an alkaline hydrogel by mixing a solution of an alkali metal silicate with a solution of an acid in an amount insufficient to neutralize more than about 95 per cent of the alkali of the silicate but sufficient to cause the formation of a hydrogel, and thereafter immersing the undried hydrogel in a dilute solution of an acid capable of setting free the remaining silicic acid for a period sufficient to provide at least substantially complete neutralization of the residual alkali of the hydrogel.

9. A process for producing silica hydrogel which comprises the steps, in sequence, of first forming an alkaline hydrogel from an alkaline reaction mixture of a solution of an alkali metal silicate and a mixture of an acid and an alkali metal silicate, and then, previous to any substantial drying of the hydrogel, neutralizing the residual alkali of the hydrogel by maintaining the hydrogel submerged in a solution of an acid until an acid silica hydrogel is produced.

10. A process for producing silica hydrogel from the reaction of a solution of an alkali metal silicate and an acid which comprises the steps, in sequence, of first mixing a solution of the alkali metal silicate with an amount of acid sufficient to form an acid solution without precipitation of the hydrogel; thereafter adding additional alkali metal silicate to the said acid mixture until an alkaline hydrogel is formed, and finally, prior to any substantial drying of the hydrogel, neutralizing the residual alkali of the hydrogel by soaking the hydrogel in a dilute solution of an acid until an acid silica hydrogel is produced.

11. A process of producing a silica hydrogel which comprises the steps, in sequence, of first forming an alkaline hydrogel by mixing a solution of an alkali metal silicate with a solution of an acid in an amount insufficient to neutralize more than about 95 per cent of the alkali of the silicate but sufficient to cause the formation of a hydrogel, thereafter dividing the undried hydrogel into small pieces, and finally immersing the pieces of undried hydrogel in a dilute solution of an acid in excess of that required for neutralizing the excess alkali in the hydrogel for a period sufficient to complete the neutralization of the residual alkali in the interior of the particles of hydrogel.

12. A process for producing silica gel which comprises the steps, in sequence, of first forming an alkaline hydrogel by mixing a solution of an alkali metal silicate with a solution of an acid in an amount sufficient to cause the formation of a hydrogel but insufficient to neutralize more than about 95 per cent of the alkali of the silicate, thereafter dividing the undried hydrogel into small pieces, soaking the pieces of undried hydrogel in an amount of dilute solution of an acid capable of setting free the remaining silicic acid in excess of that required for neutralization of the residual alkali in the hydrogel until an acid silica hydrogel is produced, and finally drying the acid treated hydrogel.

ABRAHAM SIDNEY BEHRMAN.